No. 810,516. PATENTED JAN. 23, 1906.
J. F. WILSON.
FRICTION CLUTCH.
APPLICATION FILED JAN. 9, 1905.
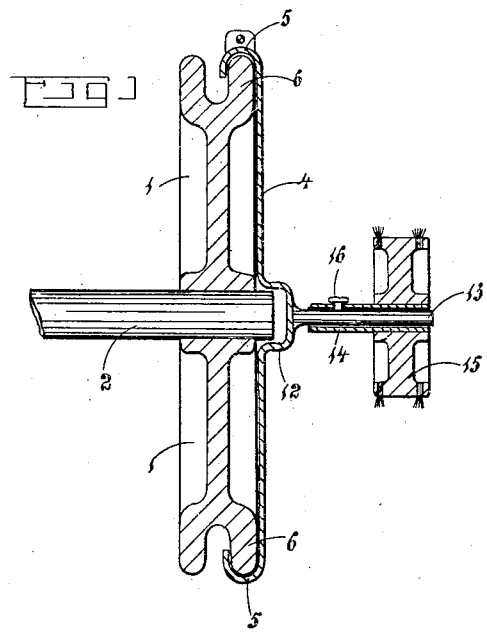
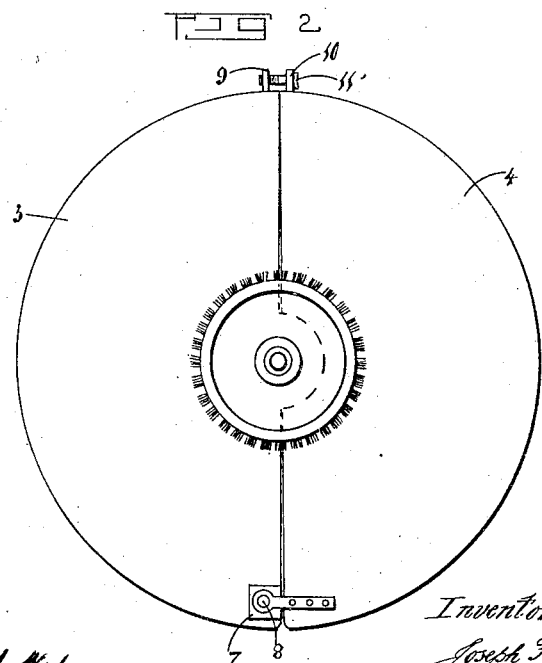
Witnesses
J. J. Watson
H. Wilson
Inventor
Joseph Ford Wilson
by his Attorney
Henry H. Hayward

UNITED STATES PATENT OFFICE.

JOSEPH FOORD WILSON, OF INVERCARGILL, NEW ZEALAND.

FRICTION-CLUTCH.

No. 810,516.

Specification of Letters Patent.

Patented Jan. 23, 1906.

Application filed January 9, 1905. Serial No. 240,374.

*To all whom it may concern:*

Be it known that I, JOSEPH FOORD WILSON, a subject of His Majesty the King of Great Britain and Ireland, and a resident of Invercargill, in the Provincial District of Southland, in the Colony of New Zealand, have invented a certain new and useful Improvement in Friction-Clutches, of which the following is a specification.
This invention provides a friction-clutch for the purpose of securing a spindle to a pulley-sheave, whereby said spindle is coaxial with the axle of the pulley-sheave. Such a friction-clutch is especially useful for the purpose of connecting a wheel-brush to one of the grooved sheaves used upon dental engines of a certain type of construction, said grooved sheaves being for the purpose of guiding the driving-cords. According hereto a disk divided diametrically in two parts has a curved flange upon its outer circumference adapted to fit over the circumference of a cheek of the grooved sheave. The two parts of the disk are hinged together upon one side and connected at the other side by a screw set-pin, which passes through ears projecting from each part of the disk. A boss upon one part of the disk is recessed to receive the end of the axle upon which the grooved sheave is mounted, and this boss carries a projecting spindle upon which fits the sleeve of the wheel-brush.

Referring to the accompanying drawings, Figure 1 is a vertical central section, and Fig. 2 a side elevation.

The grooved sheave 1, which guides the driving-cord of a dental engine, is revolubly mounted upon the end of the axle 2.

My friction-clutch comprises a disk in two parts 3 and 4, the circumference of the disk having the curved flange 5, adapted to fit over the circumference of a cheek 6 of the grooved sheave. The part 3 has an eye 7 projecting from it, which receives a pin 8, whereby a hinged joint is formed connecting the two parts of the disk together. Upon the two parts of the disk diametrically opposite to the hinged joint are the ears 9 and 10, respectively, the ear 10 having a smooth hole to receive the plain portion of a set-screw 11, while the ear 9 is threaded to receive the threaded end of said set-screw. Upon the part 3 of the disk is formed a boss 12, which is recessed to fit over the end of the axle 2. This boss carries a projecting spindle 13, upon which fits the sleeve 14 of the wheel-brush 15. A set-screw 16 passes through the sleeve to secure it upon the spindle.

In operation the set-screw 11 is taken out or slackened sufficiently to enable the flange of the disk to be fitted over the cheek of the grooved sheave. The set-screw is then screwed up to clamp the two parts of the disk together and to grip the flange tightly upon the circumference of the sheave-cheek.

What I claim, and desire to secure by Letters Patent of the United States, is—

A coupling member comprising a disk made in two parts the outer edge of which disk is bent to overlap and be secured to the periphery of another object supported on the axle, one of said parts being formed with a hollow boss fitting over the end of the axle and with a spindle extending outwardly from the boss to support the sleeve of another member, the two parts of the disk being united at one point by a hinge-joint, and at the opposite point by a bolt passing through ears formed on the periphery of the disk on each side of the line of separation, substantially as described.

In testimony whereof I have signed my name to this specification in the presence of two witnesses.

JOSEPH FOORD WILSON.

Witnesses:
 JOHN FREDERICK LILLICRAP,
 WILLIAM ANDERSON STOUT.